(12) United States Patent
Sauermann

(10) Patent No.: US 8,851,199 B2
(45) Date of Patent: Oct. 7, 2014

(54) STABILIZER FOR A LINK OF AN AGRICULTURAL TRACTOR

(71) Applicant: Hans Sauermann, Ernsgaden (DE)

(72) Inventor: Hans Sauermann, Ernsgaden (DE)

(73) Assignee: JRS GmbH & Co. KG, Ernsgaden (DE)

( * ) Notice: Subject to any disclaimer, the term of this patent is extended or adjusted under 35 U.S.C. 154(b) by 0 days.

(21) Appl. No.: 13/739,471

(22) Filed: Jan. 11, 2013

(65) Prior Publication Data

US 2013/0192856 A1    Aug. 1, 2013

(30) Foreign Application Priority Data

Jan. 30, 2012   (DE) .................... 20 2012 000 868 U

(51) Int. Cl.
*A01B 59/041* (2006.01)
*A01B 59/00* (2006.01)

(52) U.S. Cl.
CPC ............. *A01B 59/041* (2013.01); *A01B 59/004* (2013.01); *A01B 59/0415* (2013.01)
USPC .......................................... 172/450; 172/439

(58) Field of Classification Search
USPC ......... 172/439, 443, 449, 450, 446, 447, 457, 172/677, 679; 403/46; 292/278; 280/455.1
See application file for complete search history.

(56) References Cited

U.S. PATENT DOCUMENTS

| | | | | |
|---|---|---|---|---|
| 2,845,288 A | * | 7/1958 | Cierpik, Jr. ...................... | 403/46 |
| 2,935,145 A | * | 5/1960 | Du Shane et al. ............. | 172/275 |
| 3,434,737 A | * | 3/1969 | Greig et al. .................... | 172/275 |
| 4,194,757 A | * | 3/1980 | Lucas et al. .................... | 172/439 |
| 5,076,369 A | * | 12/1991 | Herchenbach ................ | 172/439 |
| 5,361,850 A | * | 11/1994 | Muller et al. .................. | 172/450 |
| 5,462,303 A | * | 10/1995 | Langen et al. ............. | 280/455.1 |
| 5,823,271 A | * | 10/1998 | Muller et al. .................. | 172/450 |
| 6,056,069 A | * | 5/2000 | Hagen et al. .................. | 172/679 |
| 6,367,369 B1 | * | 4/2002 | Coenen .......................... | 92/129 |
| 6,371,217 B1 | * | 4/2002 | Boden ........................... | 172/450 |
| 6,386,571 B1 | * | 5/2002 | Vollmer et al. ............. | 280/455.1 |
| 6,609,575 B1 | * | 8/2003 | Crabb .......................... | 172/439 |
| 6,655,468 B2 | * | 12/2003 | Casali et al. .................. | 172/439 |
| 6,769,496 B2 | * | 8/2004 | Casali et al. .................. | 172/439 |
| 7,048,071 B1 | * | 5/2006 | Huenink et al. .............. | 172/439 |
| 2002/0189828 A1 | * | 12/2002 | Casali et al. ................ | 172/439 |
| 2004/0188114 A1 | * | 9/2004 | Schlesser et al. ............. | 172/439 |

FOREIGN PATENT DOCUMENTS

DE    199 44 749 A1    4/2001

* cited by examiner

*Primary Examiner* — Matthew D Troutman
(74) *Attorney, Agent, or Firm* — Epstein Drangel LLP; Robert L. Epstein

(57) ABSTRACT

A stabilizer (1) for a link of a three-point suspension system of an agricultural tractor has at least one telescope (8) consisting of a tube (5) and a piston (6). Said tube and piston are coupled elastically by at least one spring (7) and can be adjusted in length by means of threads (12, 13). At least one retaining clip (15) which can engage over an abutment (17) is held pivotably on the tube (5). To increase the load-bearing capacity of the stabilizer (1), the stop surfaces (18) of the retaining clip (15) are connected in a tensionproof manner by means of at least one bridge (30). Said bridge (30) engages over the outer side of at least one contact surface of the abutment (17) by means of the stop surface (18).

9 Claims, 3 Drawing Sheets

STABILIZER FOR A LINK OF AN AGRICULTURAL TRACTOR

Figures 1, 2:
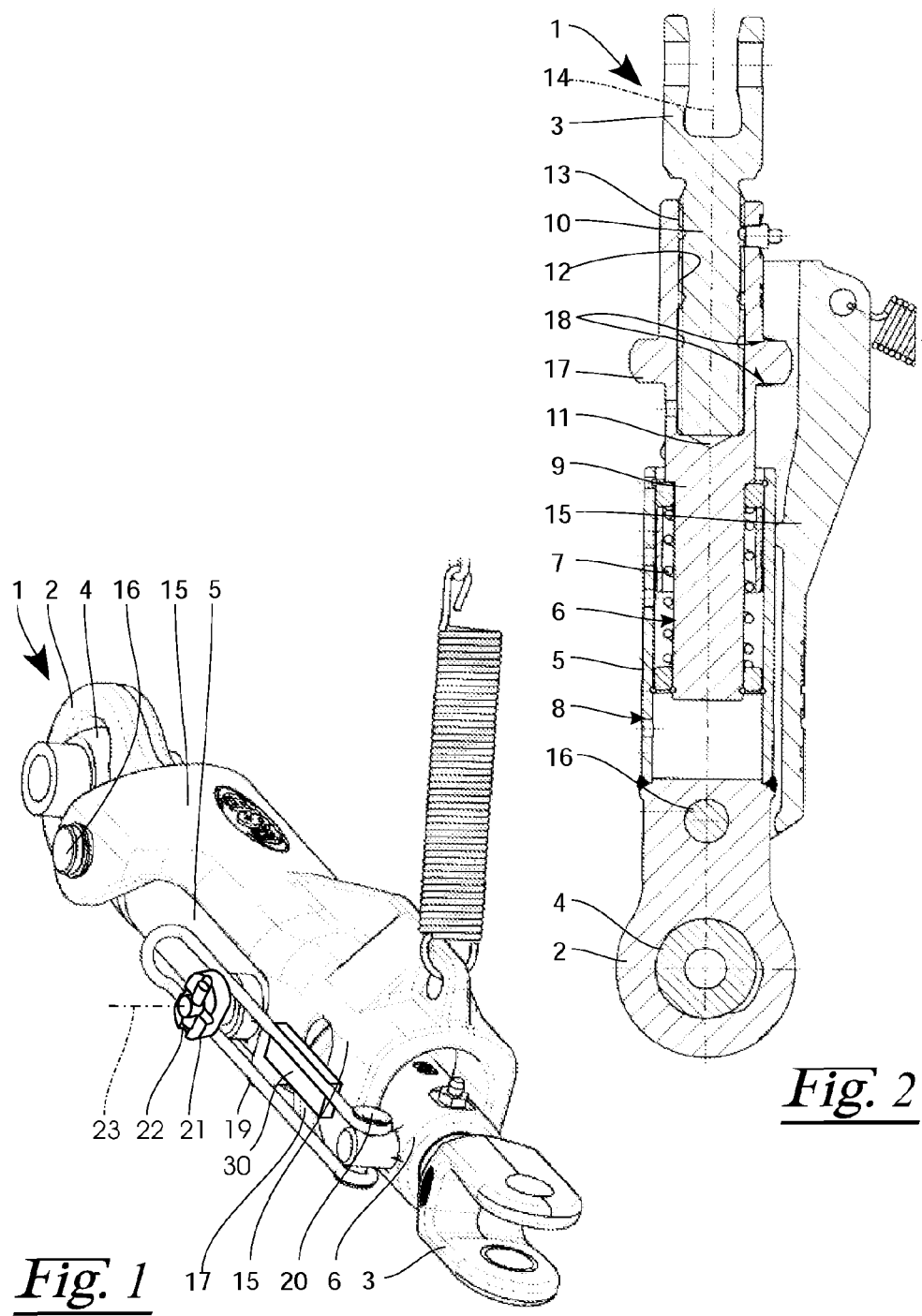

The present application claims priority to German Utility model application no:
DE 20 2012 000 868.4, filed Jan. 30, 2012.

FIELD OF THE INVENTION

The invention relates to a stabilizer for a link of a three-point suspension system of an agricultural tractor.

DESCRIPTION OF THE PRIOR ART

DE 199 44 749 A1 discloses a stabilizer for a lower link of an agricultural tractor. Said stabilizer has a telescope which is formed by a tube and a piston running therein. A spring which elastically couples the piston to the tube is provided between the two. The piston is designed in two pieces, wherein both parts can be adjusted in relation to each other by means of a thread. The piston length can thereby be set. This is important in order to be able to adapt the length of the stabilizer to particular requirements. In order to block the telescope for travel on a public road, a retaining clip is held pivotably on the tube, said retaining clip engaging over an abutment of the piston. This stabilizer has repeatedly proven worthwhile in practice and forms the starting point of the present invention.

The invention is based on the object of providing a stabilizer of the type mentioned at the beginning, which stabilizer is distinguished by a high load-bearing capacity.

This object is achieved according to the invention by the following features.

BRIEF SUMMARY OF THE INVENTION

The stabilizer according to the invention serves primarily for lower links, but is also suitable for upper links of a three-point suspension system. The stabilizer has the essential object of correcting a lateral movement of the link by spring action. A floating hitching of the working implement fastened to said stabilizer is therefore possible, which is imperative, for example, in the case of a plough. In order for said object to be fulfilled, the stabilizer has at least one telescope which is formed by a tube and a piston held displaceably therein. The piston and the tube are elastically coupled by at least one spring. During a lateral pivoting movement of the link, the stabilizer is compressed and extended, which leads to a corresponding spring force. The stabilizer thereby elastically counters the lateral movement without completely suppressing said movement. As a result, a working implement connected to the three-point suspension system of the agricultural tractor is guided elastically. Since different working implements may differ greatly in width, the length of the stabilizer has to be set. Said adjustability of the length cannot be undertaken by the telescope itself, since otherwise the working point of the spring would be considerably displaced with the width of the mounted implement. In order to obtain said setting capability, the piston is divided in two and can be adjusted in length by means of at least one thread. Therefore, by rotation of part of the piston, the length of the piston can be set in such a manner that the stabilizer can be adapted to the particular requirements of the mounted implement. The stabilizer therefore exerts an elastic force on the link of the three-point suspension system of the agricultural tractor, said elastic force, as the mounted implement increasingly swings out laterally in relation to the agricultural tractor, returning said mounted implement back into the desired track. Nevertheless, the mounted implement can execute lateral movements so that a plough may avoid, for example, a stone in the ground. This behaviour of the mounted implement that is required during operation in the field is problematic when the agricultural tractor is transferred to public road traffic. The mounted implement may swing out in particular during travel through bends, thus impermissibly putting the public road traffic at risk. For this reason, the telescope of the stabilizer has to be blocked in public road traffic. A pivoting movement of the link of the three-point suspension system of the agricultural tractor is therefore reliably suppressed. In order to be able to realize said retention in a simple manner, at least one retaining clip is held pivotably on the tube. In a retaining position, said retaining clip engages over at least one abutment of the piston. The retaining position here is to be understood as meaning any position in which the telescope is at least partially blocked. Small movability of the telescope in the retaining position is unimportant. By contrast, in a release position, the retaining clip does not influence the telescope, and therefore the latter can be moved under the action of the at least one spring. The stabilizer therefore fulfils the conditions of operation in the field and also in public road traffic.

It has now turned out that, in particular in the case of heavy mounted parts, the retaining clip at the connecting point between the stop surfaces and the abutment may break. Reinforcements of the retaining clip in this region have therefore been required, the reinforcements making the retaining clip ever heavier, this making the handling of the retaining clip considerably more difficult. To solve this problem, it is proposed to connect the stop surfaces of the retaining clip in a tensionproof manner by means of at least one bridge. In this case, said bridge engages at least partially over the outer side of at least one contact surface of the abutment by means of the stop surface. Forces which the abutment exerts on the outer stop surface of the abutment are therefore conducted on as directly as possible to the opposite stop surface. From this stop surface, said tensile forces can easily be supported by the retaining clip at the articulation thereof. Owing to this construction, the overall mass of the retaining clip can be considerably reduced, with higher supporting loads being possible at the same time.

For the further improvement in the transmission of tensile force, it is favourable if the bridge is provided at least in a region of a plane which is spanned firstly by the pivot axis of the retaining clip and secondly by a longitudinal axis of the piston. The tensile force is therefore dissipated—viewed at least in a projection from the direction of the pivot axis of the retaining clip—along a straight line and therefore in a manner free from deflection. No bending torques which could result in the breaking of the retaining clip are therefore produced.

A further possibility of increasing the possible supporting loads without having to accept too high a weight of the stabilizer consists in the formation of the retaining clip as at least one sheet-metal bent part or forged part. Owing to this measure, the retaining clip can be produced from a higher quality steel than would be possible in the case of cast parts according to the prior art. In addition, a sheet-metal bent part or a forged part has a substantially higher impact strength which makes said retaining clip insensitive in relation to impacts of the abutment. The breaking strength of the stabilizer is therefore also improved by this measure.

In principle, the retaining clip may be formed by a single sheet-metal bent or forged part. However, in order to obtain simple producibility and at the same time as small a mass of the retaining clip as possible, it is favourable for the retaining clip to be formed by at least two sheet-metal bent and/or forged parts. Said parts are then connected to one another by means of at least one weld seam. The retaining clip can therefore be manufactured with very generous proportions and with a low dead weight.

In order to obtain high dimensional rigidity of the retaining clip, it is favourable if the retaining clip engages over the tube at least in the region of a plane which is firstly spanned by the pivot axis of the retaining clip and secondly by the longitudinal axis of the piston. Tensile and compressive forces from the stop surfaces of the retaining clip are therefore directly dissipated into the pivot bearing of the retaining clip. It is therefore also not possible for any harmful bending torques to be produced in the region between the inner stop surface and the articulation of the retaining clip.

BRIEF DESCRIPTION OF THE SEVERAL VIEWS OF DRAWINGS

Other advantages and characteristics of this invention will be explained in the detailed description below with reference to the associated figures that contain several embodiments of this invention. It should however be understood, that the figure is just used to illustrate the invention and does not limit the scope of protection of the invention.

Figure 3:
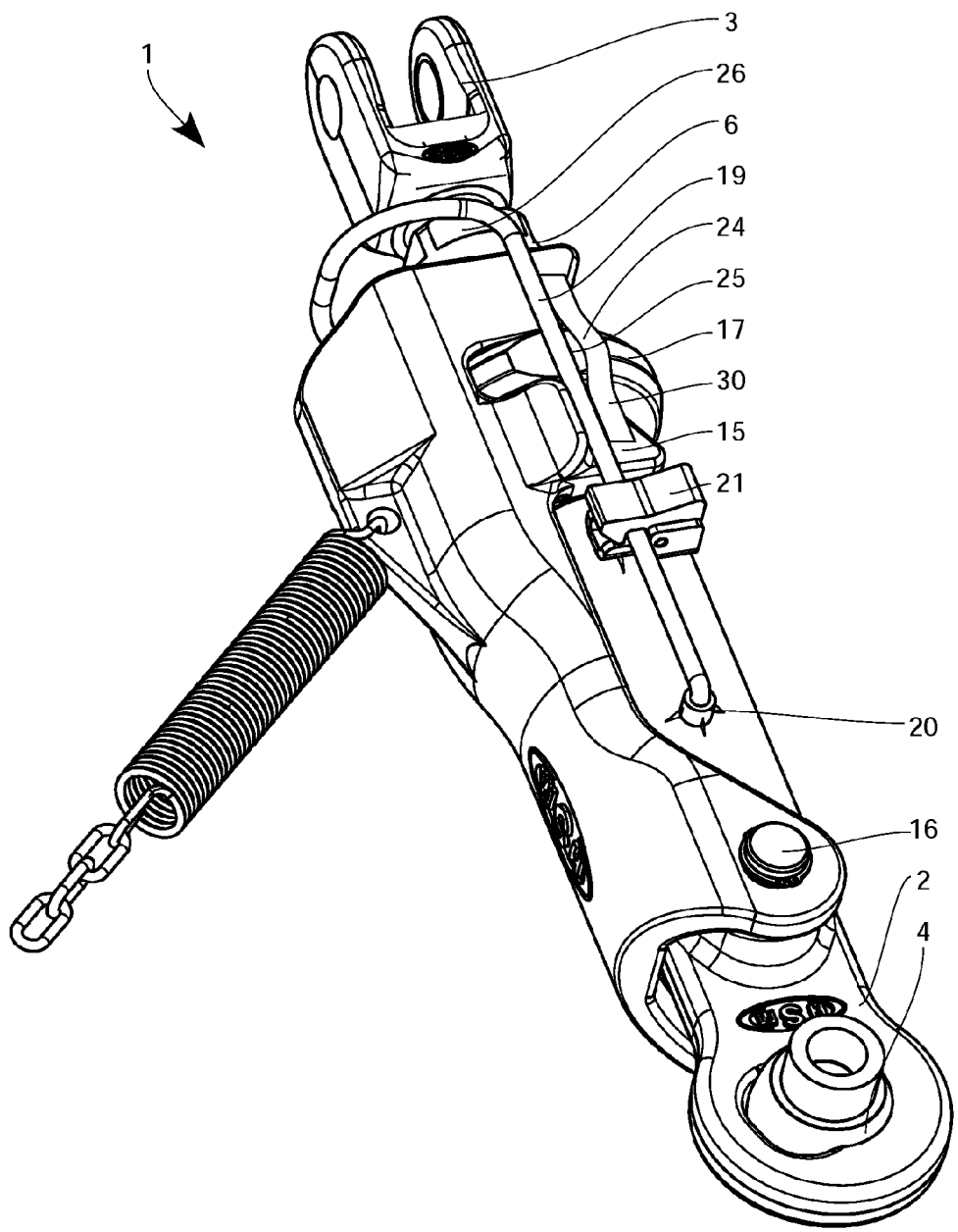
Figure 4:
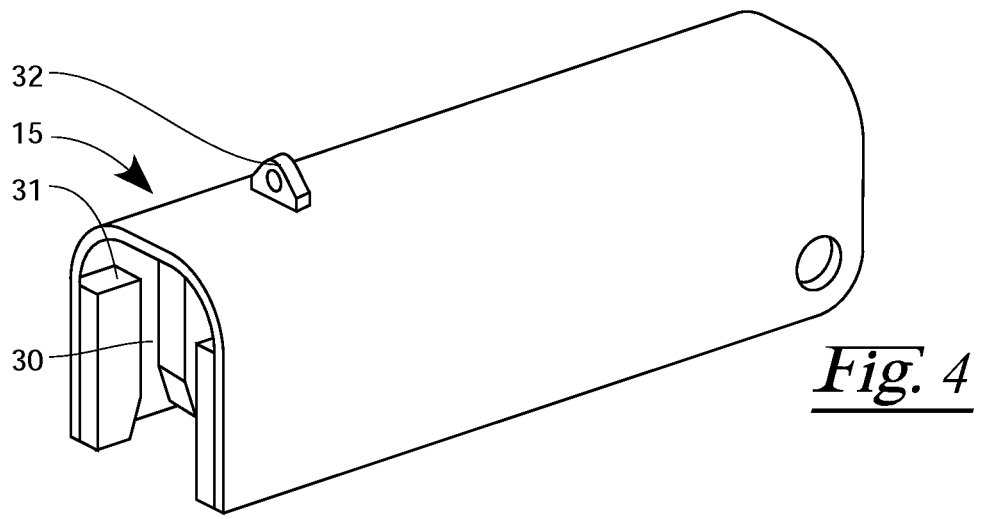
Figure 5:
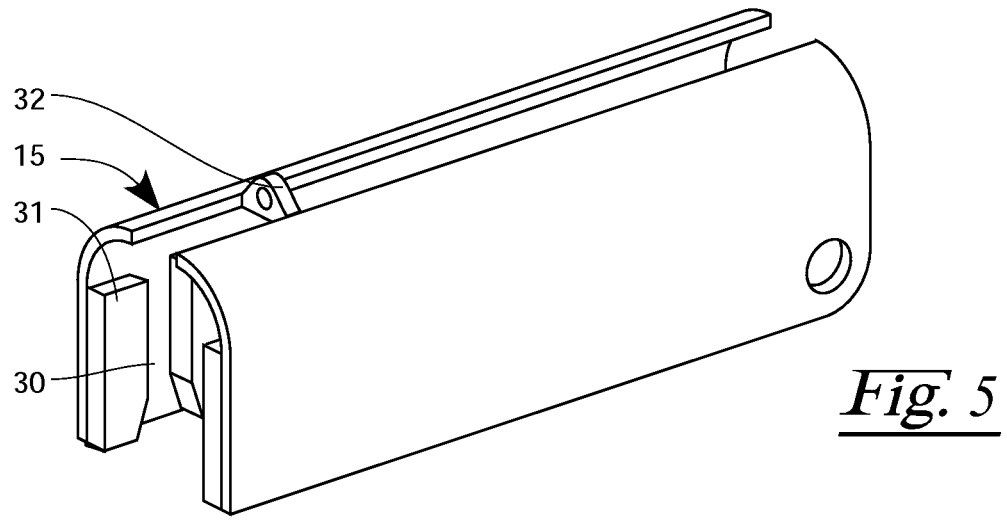
Figure 6:
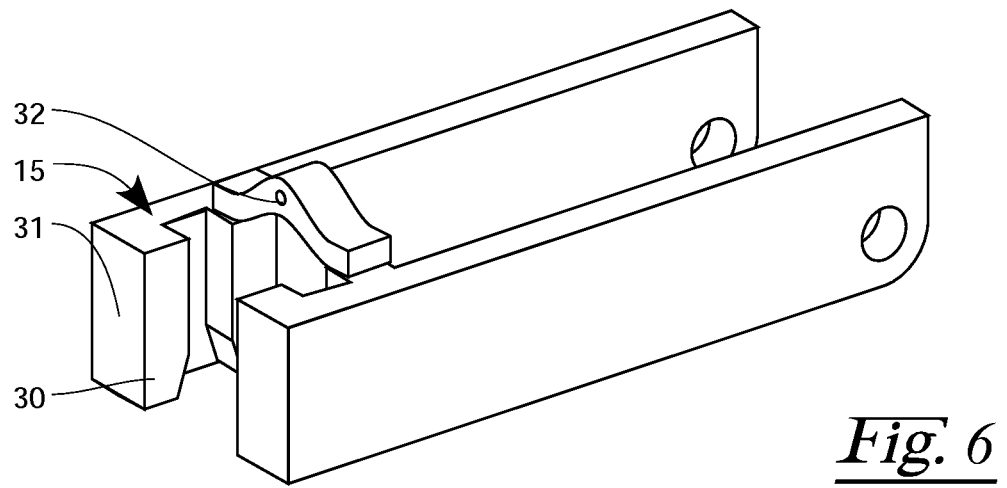

Wherein:

FIG. 1 shows a three-dimensional illustration of a stabilizer for an agriculture tractor, FIG. 2 shows an associated sectional illustration of the stabilizer according to FIG. 1, FIG. 3 shows a three-dimensional illustration of a second embodiment of a stabilizer, FIG. 4 shows a first alternative embodiment of the retaining clip, FIG. 5 shows a second alternative embodiment of the retaining clip, and FIG. 6 shows a third alternative embodiment of the retaining clip.

DETAILED DESCRIPTION OF THE INVENTION

A stabilizer 1 according to FIGS. 1 and 2 has a first bearing 2 and a second bearing 3. Customarily, the first bearing 2 is held at the rear of an agriculture tractor via a ball 4 whereas the second bearing 3 is connected to a lower link and/or upper link (not illustrated). The stabilizer 1 can therefore influence a lateral movement of the lower link and/or upper link.

The stabilizer 1 consists of a tube 5 which is connected to the first bearing 2. A piston 6 is supported displaceably in the tube 5. A spring 7 is provided between the tube 5 and the piston 6, said spring producing an elastic coupling between the tube 5 and the piston 6. The tube 5 and the piston 6 form a telescope 8 which permits a certain variation in the length of the stabilizer 1.

The piston 6 is formed in two pieces. Said piston consists of a first part 9, on which the spring 7 acts, and of a second part 10 which bears the second bearing 3. A blind hole 11 with an internal thread 12 which receives an external thread 13 of the second part 10 is provided in the first part 9 of the piston 6. If the second bearing 3 is secured to the lower link and/or upper link, said bearing cannot rotate about the longitudinal axis 14 thereof. However, by rotation of the first part 9 of the piston 6, the piston length can be set corresponding to the particular requirements.

In order to reliably avoid undesirable swinging out of the lower link and/or upper link during travel in public road traffic, it is necessary to block the telescopic capability of the stabilizer 1 in said use situation. For this purpose, a retaining clip 15 is held on the tube 5 so as to be pivotable about an axis 16. Said retaining clip 15 engages on both sides over an abutment 17 of the piston 6, which abutment is designed as a disc. For this purpose, the retaining clip 15 has two stop surfaces 18 which, in the illustrated retaining position of the retaining clip 15, bear against the abutment 17 in a planar manner. The retaining clip 15 can also be pivoted in a release position (not illustrated) in which the stop surfaces 18 are disengaged from the abutment 17. In this position, the telescope 8 can be freely moved.

In order to permit rotation of the first part 9 of the piston 6 about the longitudinal axis 14 thereof even in the retaining position of the retaining clip 15, the abutment 17 is of substantially rotationally symmetrical design. It can therefore always be checked whether the length of the stabilizer 1 has already been correctly set.

In order to prevent the length of the piston 6 from being unintentionally adjusted, a locking clip 19 is supported pivotably on the piston 6. Said locking clip 19 can be pivoted about an axis 20 and can be brought into a locking position illustrated in FIG. 2. In said locking position, the locking clip 19 engages over a further abutment 21. This suppresses rotation of the piston 6, wherein the telescopic capability of the stabilizer 1 is possible or is suppressed depending in each case on the position of the retaining clip 15. The further abutment 21 consists of a pushbutton 22 which is pressed radially away from the piston 6 in a resilient manner. By the pushbutton 22 being pressed in counter to the spring force, said pushbutton can be rotated about an axis 23. In this case, said pushbutton can be transferred from the locking position illustrated into a release position which is rotated through 90° and in which the locking clip 19 can be brought into the release position (not illustrated). In said release position, the locking clip 19 is disengaged from the further abutment 21.

Between the two stop surfaces 18, the retaining clip 15 has a respective bridge 30 on both sides, which bridge is connected to a base body of the retaining clip 15 via plug welds. This bridge 30 discharges tensile forces of the retaining clip 15 directly into the axis 16 and in this way prevents bending torques within the retaining clip 15.

FIG. 3 shows an alternative embodiment of a stabilizer 1 according to FIG. 1, wherein the same reference numbers identify the same parts. Only the differences over the embodiment according to FIG. 1 will be discussed below.

In this embodiment, the axis 20 of the locking clip 19 is located on the tube 5 and can be pivoted upwards. The locking clip 19 engages around the abutment 17 in such a manner that, in the locking position illustrated, the abutment 17 cannot be rotated. For this purpose, the abutment 17 has flattened portions 24, in the centre of which notches 25 are provided. The locking clip 19 is received in said notches 25. If a torque acts on the piston 6, said torque is transmitted via the abutment 17 to the locking clip 19. Owing to the flattened portion 24 and the notch 25, the locking clip 19 would have to be expanded in order to be able to yield to said torque. However, the stability and manner of construction of said locking clip prevents said expansion, and therefore the piston 6 cannot be rotated in said locking position.

The locking clip 19 is retained in the illustrated locking position by the further abutment 21. By actuation of said further abutment 21, the locking clip 19 can be pivoted freely about the axis 20. In the process, said locking clip becomes disengaged from the abutment 17. The abutment 17 and consequently also the piston 6 can therefore be rotated when the retaining clip 15 is closed.

Since at least four flattened portions 24 and notches 25 are provided on the abutment 17, a more sensitive adjustment of the length of the stabilizer 1 is possible than corresponds to the thread pitch of the internal thread 12 and external thread 13.

In addition, the piston has four spanner surfaces 26. Said spanner surfaces 26 serve for the connection to an open-end spanner (not illustrated) in order to permit simple rotation of the abutment 17. In restricted space conditions, complete rotation of the open-end spanner may be possible only with difficulty, if at all. By means of the provision of at least four spanner surfaces, after rotation through 90° said spanner can be re-fitted again to the next pair of spanner surfaces 26. The open-end spanner (not illustrated) is preferably secured to the stabilizer 1 via corresponding holders so that said open-end spanner is immediately available for adjustment of said stabilizer. A magnetic holder, in particular, is conceived of as the holder.

FIG. 4 shows an alternative embodiment of the retaining clip 15 in the form of a sheet-metal bent part. In this case, the retaining clip 15 consists of a metal sheet bent in a U-shaped manner. Blocks 31 which have the stop surfaces 18 for the abutment 17 are held on the inside of said metal sheet. In the simplest case, the blocks 31 are welded to the U-shaped metal sheet. In this case, the U-shaped metal sheet also forms the bridge 30 between the stop surfaces 18. The U-shaped metal sheet is drawn downwards to an extent such that a connecting line between the stop surfaces 18 and the axis 16—as viewed in projection from the direction of the axis 16—lies within the U-shaped sheet-metal part.

FIG. 5 shows an alternative embodiment of the retaining clip 15. The latter is manufactured in two parts and consists substantially of two sheet-metal parts bent in an L-shaped manner. The two parts are connected to each other by a crossmember 32. The spring 7 (not illustrated) is also mounted into said crossmember 32.

Finally, FIG. 6 shows a further embodiment of the retaining clip 15. In this case, the retaining clip 15 consists of two forged parts which are of substantially symmetrical design and also form the stop surfaces 18. Said forged parts are in turn connected to each other by means of the crossmember 32.

Since some of the embodiments of this invention are not shown or described, it should be understood that a great number of changes and modifications of these embodiments is conceivable without departing from the rationale and scope of protection of the invention as defined by the claims.

LIST OF REFERENCE NUMBERS

1 Stabilizer
2 First bearing
3 Second bearing
4 Ball
5 Tube
6 Piston
7 Spring
8 Telescope
9 First part
10 Second part
11 Blind hole
12 Internal thread
13 External thread
14 Longitudinal axis
15 Retaining clip
16 Axis
17 Abutment
18 Stop surface
19 Locking clip
20 Axis
21 Further abutment
22 Pushbutton
23 Axis
24 Flattened portion
25 Notch
26 Spanner surface
30 Bridge
31 Block
32 Cross member

The invention claimed is:

1. A stabilizer for a link of a three-point suspension system of an agricultural tractor comprising: a telescope consisting of a tube and a piston linearly moveable therein in a given direction, a spring coupling said tube and said piston; said piston comprising first and second parts, and means for connecting said piston parts such that one of said piston parts can be rotated relative to the other of said piston parts to adjust the length of said piston; an abutment extending from said piston and comprising first and second generally radially extending opposing stop surfaces, and an exterior facing surface intersecting and extending between said opposing stop surfaces in said given direction; and a retaining clip comprising first and second spaced engaging parts, said retaining clip being pivotally mounted to said tube and moveable between a retaining position, wherein said engaging parts of said clip engage said opposing stop surfaces of said abutment to prevent movement of said piston relative to said tube in said given direction, and a release position, wherein said engaging parts of said clip are remote from said abutment, such that said piston is moveable relative to said tube in said given direction, wherein said retaining clip comprises a bridge portion which extends between said engaging parts and overlaps said exterior facing surface of said abutment when said retaining clip is in the retaining position.

2. The stabilizer according to claim 1, wherein said retaining clip has a pivot axis and said piston has a longitudinal axis, and said bridge engages over said stop surfaces of said abutment at least in a region of a plane containing said pivot axis of said retaining clip and said longitudinal axis of said piston.

3. The stabilizer according to claim 1, wherein said retaining clip comprises at least one sheet-metal bent part.

4. The stabilizer according to claim 3, wherein said retaining clip has at least two of said sheet-metal bent parts being connected by means of at least one weld seam.

5. The stabilizer according to claim 1, wherein said retaining clip comprises at least one forged part.

6. The stabilizer according to claim 5, wherein said retaining clip has at least two of said forged parts, being connected by means of at least one weld seam.

7. The stabilizer according to claim 1, wherein said retaining clip comprises at least one sheet-metal bent part and at least one forged part, being connected by means of at least one weld seam.

8. The stabilizer according to claim 1, wherein said tube having an outer side, said retaining clip having to pivot axis and said piston having a longitudinal axis, and said retaining clip engages over said outer side of said tube at least in a region of a plane containing said pivot axis of said retaining clip and said longitudinal axis of said piston.

9. A stabilizer for a link of a three-point suspension system of an agricultural tractor comprising: a telescope consisting of a tube and a piston linearly moveable therein along a longitudinal axis, a spring coupling said tube and said piston; said piston comprising first and second parts, and means for connecting said piston parts such that one of said piston parts can be rotated relative to the other of said piston parts to adjust the length of said piston; an abutment extending from said piston and comprising first and second generally radially extending opposing stop surfaces, and an exterior facing surface intersecting and extending between said opposing stop surfaces in said given direction; and a retaining clip comprising first and second spaced engaging parts, said retaining clip being moveably mounted to said tube about a pivotal axis and movable between a retaining position, wherein said engaging parts of said clip engage said opposing stop surfaces of said abutment to prevent movement of said piston relative to said tube in said given direction, and a release position, wherein said engaging parts of said clip are remote from said abutment, such that said piston is moveable relative to said tube along said longitudinal axis, wherein said bridge portion intersects the plane containing said pivot axis of said retaining clip and said longitudinal axis of said piston.

* * * * *